Figure 1:
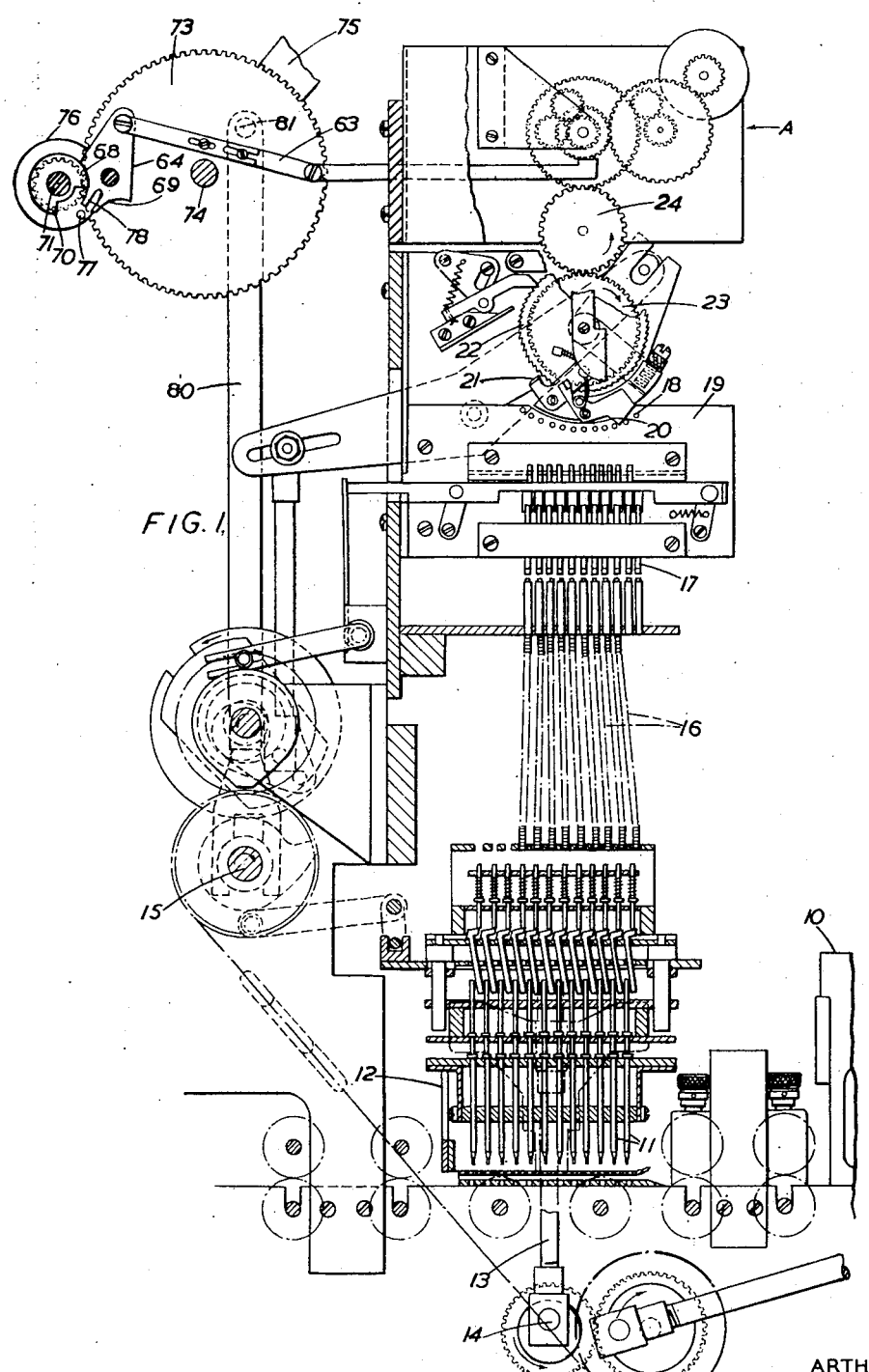

Sept. 18, 1951 A. THOMAS 2,568,523
ZEROIZING MECHANISM
Filed Jan. 28, 1948 8 Sheets-Sheet 1

Inventor
ARTHUR THOMAS
By John L Sterling
Attorney

Sept. 18, 1951      A. THOMAS      2,568,523
ZEROIZING MECHANISM
Filed Jan. 28, 1948      8 Sheets-Sheet 2
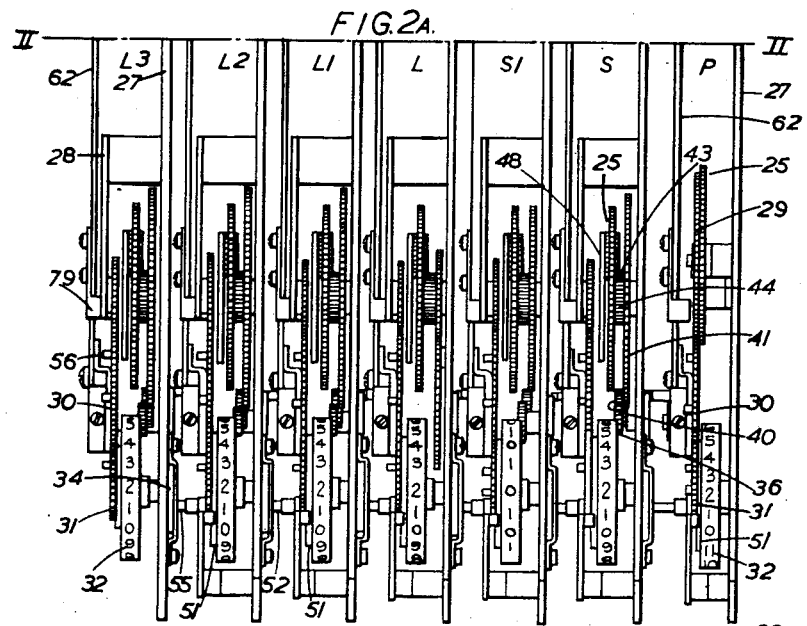
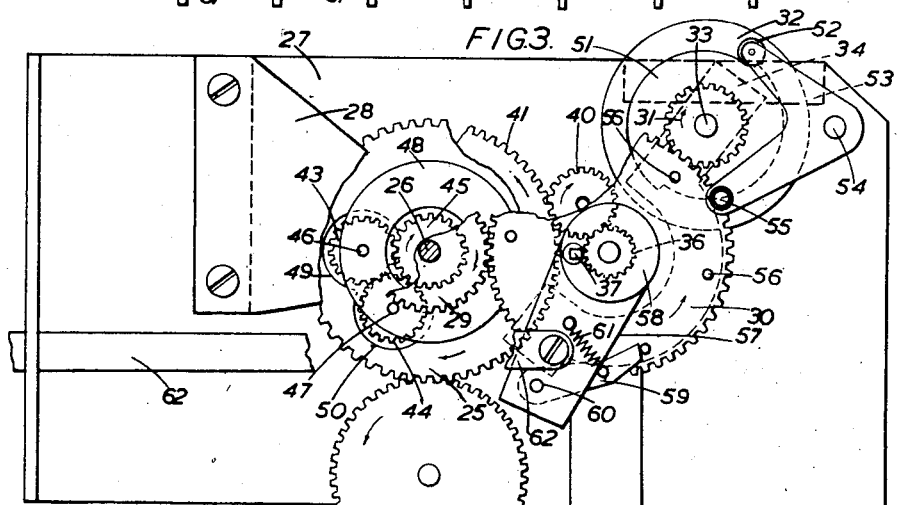
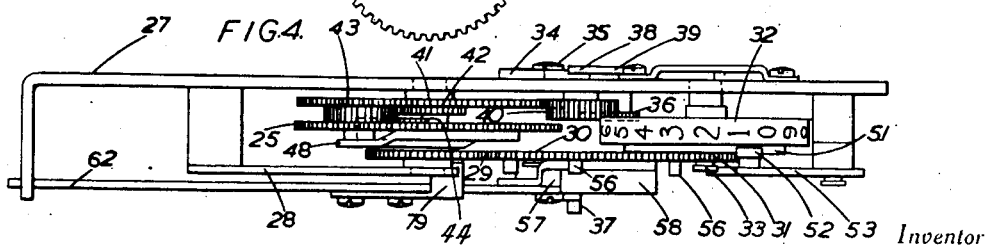
Inventor
ARTHUR THOMAS
By *J. L. Sterling*
Attorney Sept. 18, 1951
A. THOMAS
2,568,523
ZEROIZING MECHANISM
Filed Jan. 28, 1948
8 Sheets-Sheet 3
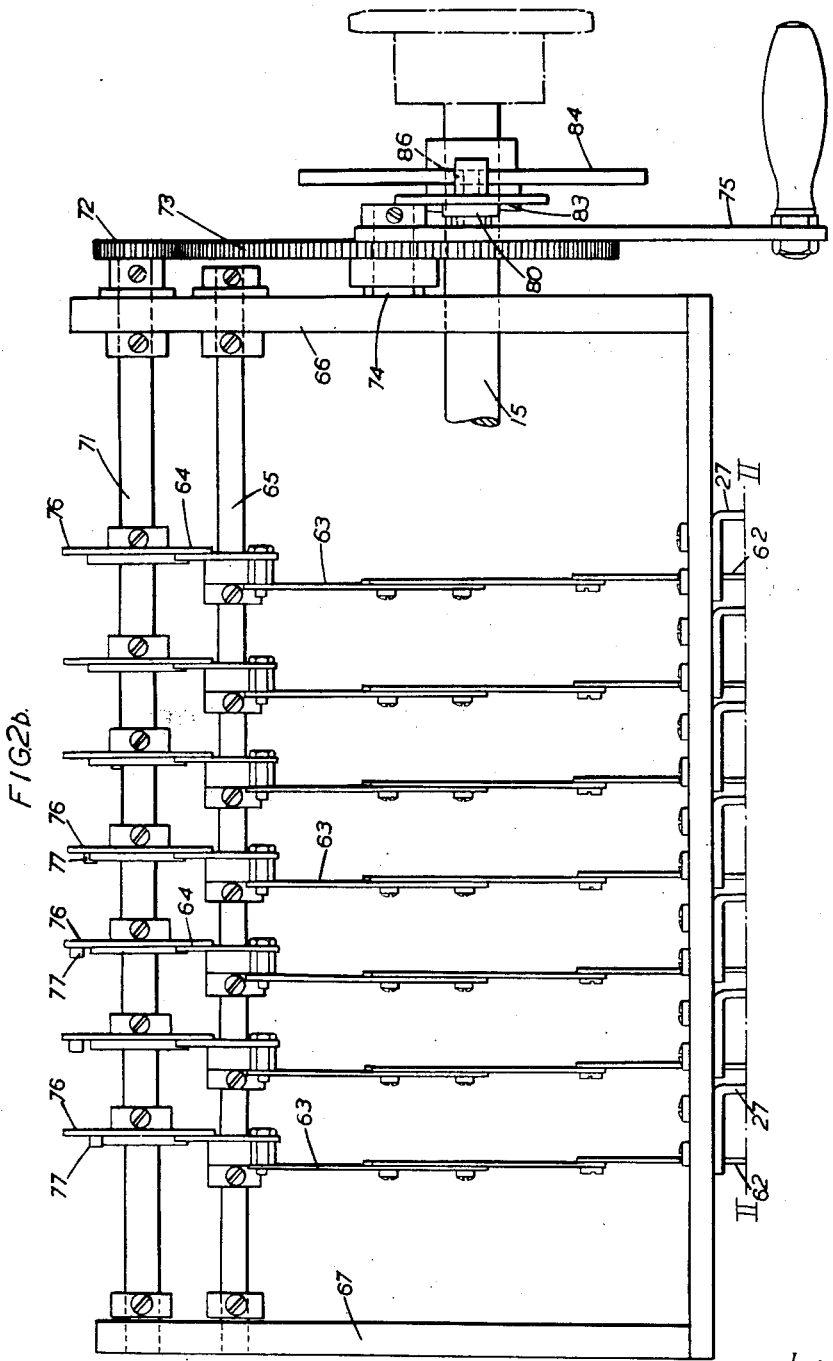
Inventor
ARTHUR THOMAS
By J&L Sterling
Attorney

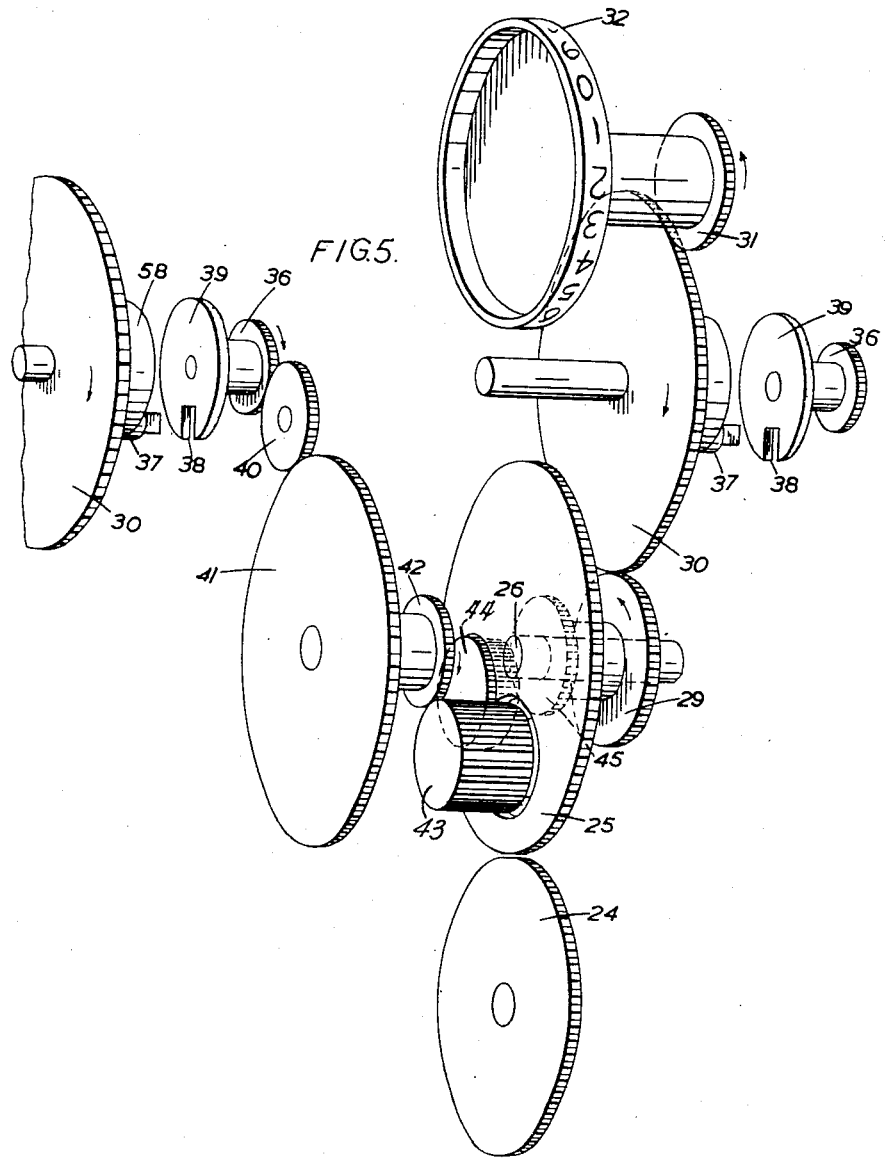

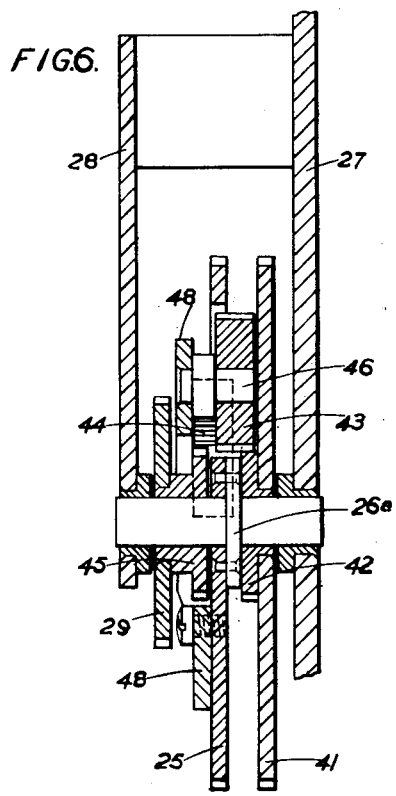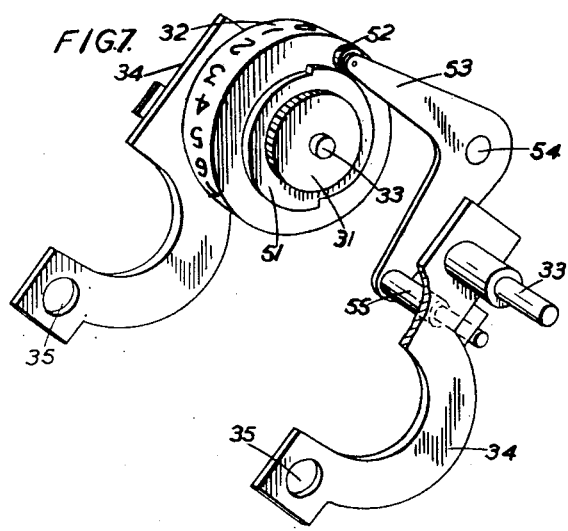

Sept. 18, 1951          A. THOMAS          2,568,523
ZEROIZING MECHANISM
Filed Jan. 28, 1948          8 Sheets-Sheet 6
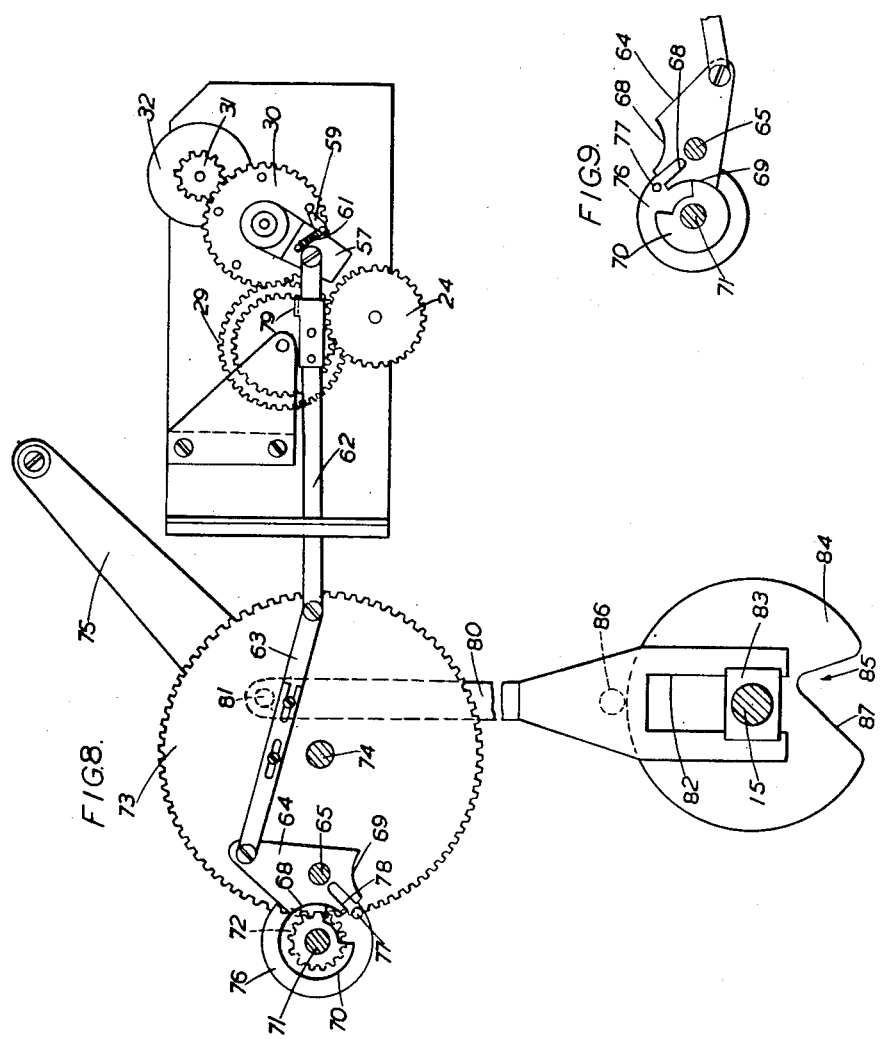
Inventor
ARTHUR THOMAS
By *J. L. Sterling*
Attorney Sept. 18, 1951 A. THOMAS 2,568,523
ZEROIZING MECHANISM
Filed Jan. 28, 1948 8 Sheets-Sheet 7

Inventor
ARTHUR THOMAS
By John L. Sterling
Attorney

Sept. 18, 1951 A. THOMAS 2,568,523
ZEROIZING MECHANISM
Filed Jan. 28, 1948 8 Sheets-Sheet 8
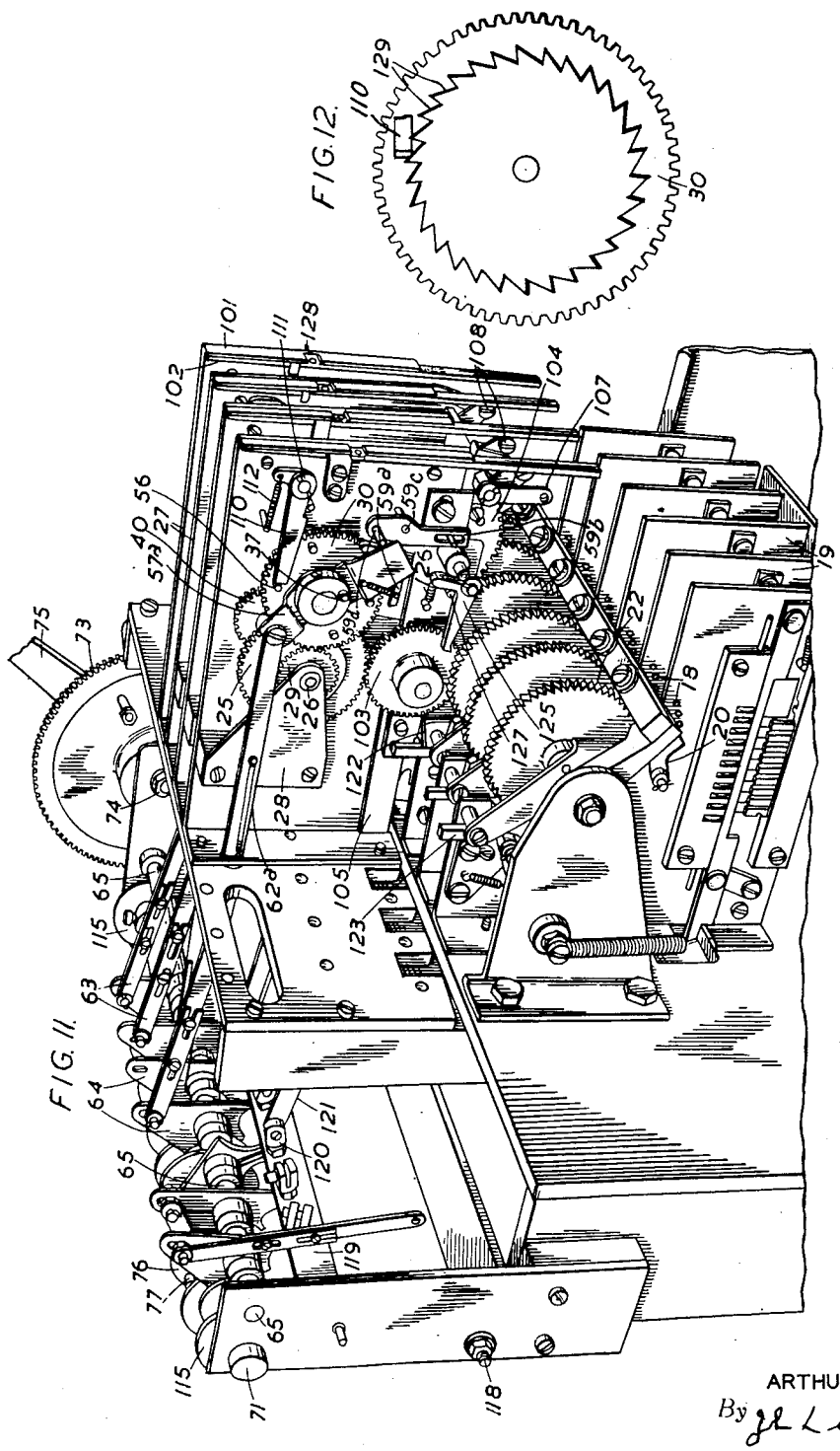
Inventor
ARTHUR THOMAS
Attorney Patented Sept. 18, 1951

2,568,523

UNITED STATES PATENT OFFICE 2,568,523

ZEROIZING MECHANISM

Arthur Thomas, Wallington, England, assignor to Powers-Samas Accounting Machines Limited, London, England, a British company Application January 28, 1948, Serial No. 4,765
In Great Britain February 3, 1947

9 Claims. (Cl. 235—144)

This invention relates to zeroizing means for accumulators having in each denominational order a resultant wheel which, by its angular position, indicates the total of the amounts accumulated in the order, and more particularly to zeroizing means especially adapted for use with the creep-carry accumulator covered in application Serial No. 139,270, which is a division of the present application.

One object of the invention is the provision of means operable to zeroize successively, the several denominational orders of an accumulator geared to handle amounts in accordance with a variety of systems of rotation.

In a preferred construction the restoring means comprises a rotatable zeroizing shaft, means to rotate the said shaft, a plurality of discs secured to the shaft, one disc for each denominational unit, a pivoted lever for each disc, an operating pin extending laterally from each disc to co-operate with a slot in its associated pivoted lever to effect oscillation of the lever, an arm for each denominational unit, said arm being pivoted about the axis of rotation of the resultant gear for the unit, a pawl pivoted to said arm and resiliently held in operative position, a plurality of equi-spaced lateral zeroizing elements extending from the resultant gear for engagement by said pawl, and links connecting said arm with the pivoted lever, associated with the unit, said operating pins being disposed in predetermined angular relationship so that one operating pin engages with the slot in its associated lever after the next lower denominational unit has been zeroized by its associated zeroizing mechanism.

In one construction according to the invention the zeroizing elements are moved by the pawl against a locating stop, and if desired, the locating stop may be spring-urged to the position at which it is first engaged by a zeroizing element during a zeroizing operation and is moved from said position by the zeroizing element against the action of the spring to zero position.

Another object of the invention is the provision of means for actuating total indicators under control of the zeroizing means.

The actuating means for the indicators may comprise a toothed wheel coaxially and angularly movable with a transmission gear for entering values into each denominational order and connecting means between the toothed wheel and the indicator whereby linear movement of the toothed wheel is transmitted to the indicator. The connecting means between the toothed wheel and the indicator for each unit is, in one construction, mounted on a member movable by the restoring means, whereby connection is effected between the toothed wheel and the indicator only during actuation of the restoring means. In this construction each indicator is guided for movement in a straight line path and the connecting means comprises a toothed element carried by said movable member and link mechanism supported by the toothed element and its associated indicator and pivotally connected therebetween. The movable member is preferably actuated by cams on the zeroizing shaft.

Preferably, constructions according to the invention are provided with a safety device to prevent the operation of the restoring means during an accumulating operation. The safety device in a preferred form comprises a link slidable relatively to the main drive shaft of the machine to which the accumulator is fitted and connected with the means for rotating the zeroizing shaft, said link carrying a roller to engage the periphery of a disc mounted for rotation with said main drive shaft, the disc having a peripheral aperture with which the roller is aligned to effect operation of the zeroizing mechanism, a side of said aperture being so constructed as to cause the roller to be moved out of the aperture on rotation of said main driving shaft.

Figure 10:
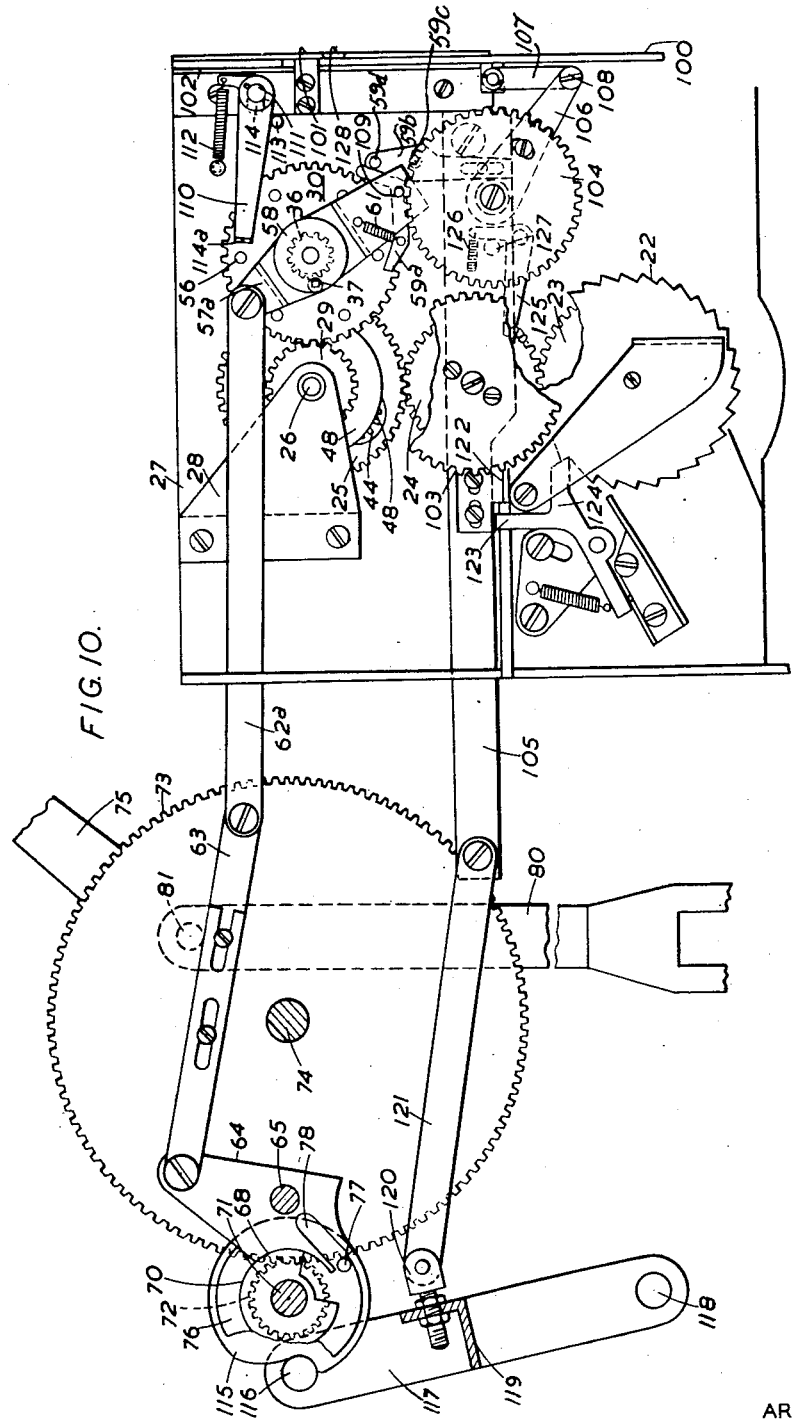

In order that the invention may be clearly understood two embodiments thereof will now be described, by way of example, with reference to the accompanying drawings in which:

Figure 1 is a side elevation, partly in section, of a statistical machine having the invention applied thereto, Figure 2a is a plan of part of the accumulator mechanism indicated generally in Figure 1 by the reference letter A, the denominational order units being shown diagrammatically, Figure 2b is a continuation of Figure 2a joining that figure on the line II—II, Figure 3 is a side elevation of one of the counter units, some parts of the figure being broken away to show the integers normally hidden behind such parts, the units illustrated being one employed for tens or hundreds of pounds, Figure 4 is a plan of the counter unit shown in Figure 3, Figure 5 is a perspective view of the carry-over mechanism for one of the counting units, the parts being shown diagrammatically and in partial exploded disposition, Figure 6 is a section through the differential gearing, Figure 7 is a perspective view of a detail showing compensating mechanism for maintaining a figure on an indicator wheel in reading position, Figure 8 is a side elevation of the unit employed for counting pence and having connected therewith the zeroising mechanism, and Figure 9 shows a detail of the mechanism illustrated in Figure 8, Figure 10 is a side elevation of modified form of the accumulator unit shown in Figure 3, Figure 11 is a perspective view showing a portion of a machine having several accumulator units in position and some parts omitted for clarity, in this figure the foremost unit shown is that for the units of pounds, and, Figure 12 is a side elevation of the tens of shillings carry-over wheel employed in the construction shown in Figures 10 and 11.

In the accumulator about to be described, the record cards from which data is sensed, will be assumed to be punched to record amounts in shillings and pence but the accumulator will register a total in pounds, shillings and pence. For example, a sum of 83 shillings and 9 pence sensed from a record card will be registered in the accumulator as 4 pounds 3 shillings and 9 pence.

Referring to Figure 1, the machine shown therein comprises a statistical machine by means of which sterling amounts, in shillings and pence as indicated above, sensed from perforated record cards are transferred to accumulator mechanism, as indicated by the reference letter A, at a relatively high speed and are registered therein in pounds, shillings and pence. As shown diagrammatically in Figure 2a, the accumulator mechanism comprises the following denominational order sections; a pence unit P, a shillings unit S, a tens of shillings unit S1, a pounds unit L, a tens of pounds unit L1, a hundreds of pounds unit L2, and a thousands of pounds unit L3.

The machine, and the mechanism for operating the accumulator wheels of the accumulator mechanism is described in British patent application No. 26,189/45 (Serial No. 600,983) and only a brief reference to the major features thereof will be made herein.

The machine shown in Figure 1 consists of a record card magazine 10 from which cards are fed beneath sensing pins 11 mounted in a reciprocating pin box 12, the pin box being reciprocated by a lever 13 and eccentric 14 driven from the main drive shaft 15 of the machine. The pins, should they pass through perforations in a record card, transfer the information so sensed to flexible cables 16 which in turn operate plungers 17. These plungers cause pins on pivoted arms, not shown, to be projected through apertures 18 in a plate 19 and a pin so projected through the plate 19 engages the tail 20 of a latching member for a pawl 21 to be tripped and so release the pawl 21 to engage with the ratchet teeth of an accumulator wheel 22. An accumulator wheel 22 is associated with each of the indicator wheels described below.

To the rear face of the accumulator wheel 22, as viewed in Figure 1, there is secured for rotation therewith a driving gear wheel 23, this gear wheel meshing with an idler gear wheel 24.

From this point it will be convenient, for the present, to ignore the pence unit as there is no lower denominational order unit from which a carry-over is effected to the pence unit and this unit therefore differs slightly from the remaining units all of which are similarly constructed.

Reference to the construction of the pence unit will be made later.

In each of the units, which represents a single digital column, the idler 24 meshes with peripheral teeth on a differential cage 25, Figures 3, 5 and 6. The cage 25 is riveted to a flange 26a, Figure 6, on a spindle 26 which is rotatable in frame plates 27, 28. On one side of the cage 25 is a driving gear 29 freely rotatable on the spindle 26 and meshing with a resultant gear 30 which, as will become apparent hereinafter, indicates by its angular position the total of the input and carry amounts accumulated in the denominational order of which it is a part, but which, in order to make said total visible, in turn, meshes with an indicator gear 31 secured to an indicator wheel 32 mounted for rotation on a spindle 33 carried in a bearing arm 34 pivoted at 35 to the frame plate 27 (see also Fig. 7).

Rotation of the cage 25 by the idler 24 effects rotation of the driving gear 29 and the resultant gear 30 as described below. The driving gear 30, however, has twice the angular movement of the cage 25 and to neutralise this the resultant gear and driving gear are given a 2:1 reduction, whereby a driving feed of one tooth on the accumulator wheel 22 rotates the resultant gear a distance of one tooth. As the gear 31 is provided with twenty teeth and the indicator wheel being considered has two sets of ten characters thereon a feed of one tooth on the resultant gear 30 results in a feed of one character on the indicator wheel 32.

The resultant gear 30 is coupled with the first gear 36 forming a part of a train of reduction gearing associated with the next higher unit. Connection between the said resultant gear 30 and the gear 36 is effected by a resultant member 37 projecting laterally from the resultant gear 30 and engaging in a slot 38, Figure 5, in a flange 39 carried by said first gear 36. Thus as the resultant gear 30 rotates a corresponding angular movement is imparted to the first gear 36 of the train of reduction gearing.

The train of reduction gearing includes an idler 40, and a gear 41 freely rotatable on the spindle 26 and mounted for simultaneous rotation with a second sun-gear 42 engaging with a planetary pinion 43 of said next higher unit. The planetary pinion 43 meshes with a further planetary pinion 44 which meshes with a first sun-gear 45 freely rotatable on the spindle 26 and secured to the driving gear 29 for rotation therewith. The planetary pinions 43 and 44 are supported for rotation about short spindles 46 and 47, Figure 3, positioned in an annular bearing member 48 secured to the cage 25. As can be seen from Figure 4, that part of the member 48 which supports the pinions 43 and 44 is set away from the face of the cage 25 and the pinions 43 and 44 extend into apertures 49, 50, Figure 3, in cage 25.

When the mechanism is in operation, the carry-over action is continuous and means is provided to ensure that the indicator wheels read correctly. For this purpose each indicator wheel is, as stated above, supported by a pivoted arm 34. To ensure that the gear 31 does not disengage from the resultant gear 30, the axis of the pivot 35 of the arm 34 is located in the plane containing the axes of the resultant gear 30 and the indicator gear 31. A compensating cam 51 having, in instances where the indicator wheel has twenty characters, two peripheral steps is secured to the indicator wheel. The peripheral surface of the cam rises gradually from the bottom of each said step to the top of said other step.

Engaging with the periphery of the cam 51 is a follower roller 52 carried by one arm of a bell-crank 53 pivoted at 54. The other arm of the bell-crank has secured thereto a pin 55 which engages the arm 34 of the next higher unit, see Figure 7. By this means, as the indicator wheel is rotated and the carry-over is affected to the next higher unit, the cam 51 gradually rocks the bell-crank 53 about its pivot 54 and the pin 55 rocks the arm 34 of the next higher unit backwards by the same distance as the next higher indicator has been rotated due to the carry-over thus the registered character on the said next higher unit remains in reading position during the passage of the indicator wheel of lower order between 0 and 9 whereupon the roller 52 drops over the step on the cam 51 so that the pin 55 suddenly disengages the arm 34 of the next higher unit and the said arm 34 drops one tooth space of the gear 31 to present to reading position the next succeeding character on the indicator wheel of the next higher unit.

As stated above, the pence unit differs slightly from the foregoing description due to the fact that it is not associated with a unit of lower order. In the construction of the pence unit, therefore, no gear 36 and idler 40 is provided and the gears 29 and 25 comprise a compound idler. Also the indicator gear has twenty-four teeth as the indicator wheel has twenty-four characters, two sets of 0 to 11. But for these modifications the foregoing description appertaining to the units of higher orders applies also to the pence unit.

It will, of course, be appreciated that the reduction obtained by the carry-over train of reduction gearing will not be the same for each of the units as the reduction obviously depends on the values being registered on the particular unit. Thus, the carry-over reduction from the pence to the units of shillings section gives a 6:1 reduction, from the units of shillings to the tens of shillings section the reduction is 5:1, from the tens of shillings to the units of pounds the reduction is 1:1, and each of the remaining pounds sections has a carry-over reduction of 5:1.

To reset the indicator wheels to zero it is necessary to reset each unit in turn commencing with the lowest denominational order unit, that is the pence unit, and then, successively, each succeeding higher unit. For this purpose each resultant gear 30 is provided with a plurality of equi-spaced lateral zeroising pins 56, the spacing between the pins being equal to the number of characters in a set on the particular indicator wheel. Thus, for the units of shillings wheel, the pins are located ten tooth spaces apart while on the pence resultant gear the pins are located twelve tooth spaces apart.

An arm 57 is mounted to swing freely on a boss 58, Figure 5, of the resultant gear 30 and carries a pawl 59 (see also Fig. 3) pivoted thereto at 60. A spring 61 retains the pawl in position to engage a pin 56 on the gear 30.

During an accumulating operation the resultant gear 30 rotates anti-clockwise, Figure 3, and the pins 56 move the pawl 59 against the action of the spring 61 so that the pins pass the pawl. When, however, the indicator wheel is to be zeroized, the pawl is moved in an anti-clockwise direction, as viewed in Figure 3, until it engages one of the pins 56. The pawl then continues to the end of its operative stroke, moving the pin so engaged, and the indicator wheel is rotated until 0 appears in the reading position.

Operation of the pawl 59 is effected by a link 62 connected at one end to the swinging arm 57 and at the opposite end to a connecting link 63 which is, in turn, connected to a lever 64 mounted on a spindle 65 carried in frames 66 and 67, Figure 2b. The lever 64 has two curved peripheral portions 68 and 69 (Fig. 8) to engage the periphery of a locking plate 70 secured to a spindle 71 also carried in the frames 66 and 67.

To one end of the spindle 71 is secured a gear 72, Figure 2b, which meshes with a larger gear 73 mounted on a stub shaft 74 in the frame 66. A handle 75 is secured to the gear 73 and on depression of the handle the spindle 71 is rotated carrying with it a disc 76 having a lateral operating pin 77 secured thereto, and the locking plate 70. During this movement the curved peripheral portion 68 of the lever 64 engages the periphery of the locking plate 70 and the pin 77 is moved into a slot 78 formed in the lever 64. This pin and slot operate to provide a form of Geneva movement and as the spindle 71 continues its rotation the lever 64 moves the links 63 and 62 to effect the forward movement of the pawl 59.

As the pin 77 passes its dead centre, it begins to withdraw from the slot 78 and the curved peripheral portion 69 of the lever 64 is engaged by the peripheral surface of the locking plate as shown in Figure 9.

To prevent over-running of the resultant gear 30, due to the high speed at which the pawl 59 is operated, a locating plate 79 is secured to the link 62 and is moved thereby into the path of the pin 56 next succeeding the pin engaged by the pawl.

From Figure 2b it will be seen that the operating pins 77 for the different units are disposed at successively different angular positions. The angular disposition of these pins is so selected that one pin becomes operative immediately the next preceding pin has effected the zeroising of its associated indicator wheel. The selection is also so made that all of the pins become successively operative during an angular movement of less than 90 degrees of the gear 73.

To ensure that the re-setting handle 75 is operated only when the machine is at rest a safety device is provided. This device comprises a link 80, one end of which is pivoted at 81 to the gear 73. The opposite end of the link 80 has a slot 82 which slides on the block 83 loosely mounted on the main shaft 15 of the machine.

Secured to the main shaft 15, for rotation therewith, is a disc 84 having a gap 85, Figure 8. A pin 86 projects laterally from the link 80 and engages the periphery of the disc 84 and while the pin 86 is in engagement with the periphery of the disc the handle 75 cannot be depressed.

To effect a re-setting of the indicator wheels, the pin 86 must be aligned with the gap 85 in the disc 84 and should an attempt be made to depress the handle while the machine is running the only result will be that the handle will be knocked up due to the pin riding up the sloping side 87 of the gap 85. This effect will, of course, also be obtained if an attempt is made to hold the handle down when starting up the machine.

The operation of the units of the accumulator mechanism will now be described with reference to the units of pounds unit, the tens of pounds unit, and the hundreds of pounds unit, it is, however, to be understood that the other units of the mechanism also operate in the manner about to be described.

First, let it be assumed that the values 3, 5, and 7 are being registered in the tens of pounds unit, which is initially set at zero and that no carry-over is being effected from the units of pounds column. In this case, the pawl 21, Figure 1, first feeds the accumulator wheel 22 a distance of three teeth and the driving gear 23 and idler 24 are turned through corresponding angular distances. The gear 41 between the tens of pounds unit and the units of pounds unit is held against rotation by the resultant gear of the units of pounds unit, thus the angular movement of the idler 24 of the tens of pounds unit is transmitted thereby to the cage 25 meshing therewith and thence through the first sun-gear 45, the gear 29 and resultant gear 30, the gear 31 is turned three teeth so that the tens of pounds indicator registers a 3. During the rotation of the cage 25 the planetary pinion 43 rotates freely round the sun-gear 42 meshing therewith and the pin 37 on the resultant gear 30 of the tens of pounds unit rotates the flange 39 associated with the first gear 36 of the hundreds of pounds unit so that the hundreds of pounds indicator wheel is moved from 0 to 0.3. Due, however, to the action of the compensating cam 51 on the tens of pounds indicator wheel and its associated bellcrank 53, as described above, the 0 registered on the indicator wheel of the hundreds of pounds unit remains in reading position. The rotation of the indicator wheel of the hundreds of pounds unit is effected through the train of reduction gears 40, 41 and 42 of which the gear 36 is the first gear and the last gear 42 rotates the planetary pinion 43 of the hundreds of pounds unit differential. The pinion 43 rotates the other planetary pinion 44 and this, in turn, rotates the sun-gear 45 which, being coupled with the gear 29 of the hundreds of pounds unit, effects rotation of the indicator wheel of the hundreds of pounds unit.

When, during the next cycle the value 5 is entered, the gears operate as just described but with the result that the tens of pounds indicator wheel is rotated a further five teeth to register an 8 in the reading position and the indicator wheel of the hundreds of pounds unit is turned from 0.3 to 0.8 but the 0 remains in the reading position.

During the third cycle, the gear 31 on the indicator wheel of the tens of pounds unit is turned a further seven teeth with the result that the indicator wheel is turned to register a 5 in the reading position. The rotation of the seven teeth of the gear 31 is, of course, continuous but as the 0 registers on the indicator wheel the roller 52 on the bell-crank 53 drops suddenly over the step on the cam 51 with the result that the arm 34 carrying the indicator wheel of the hundreds of pounds unit drops back and this indicator wheel registers a 1 in the reading position. At the end of the cycle, when the 7 has been registered and the 5 appears on the tens of pounds indicator wheel in the reading position, the indicator wheel of the hundreds of pounds unit shows a 1 in the reading position but actually registers 1.5.

Let it now be assumed that the indicator wheel of the tens of pounds unit registers 3 and that a 4 is being registered simultaneously with a carry-over from the units of pounds unit.

In this instance, the tens of pounds unit will be operated in the manner just described above insofar as the registration of the 4 is concerned but while the cage 25 is rotating to effect this registration the planetary pinions 43, 44 are being positively driven by the last gear 41 of the train of reduction gearing associated with the units of pounds unit with the result that the angular velocity of the gear 29 is momentarily increased and a 5 is registered on the tens of pounds indicator wheel instead of a 4. Thus, the number registered in the reading position on the indicator wheel of the tens of pounds unit at the end of this cycle is 8 and 0.5 is carried over to the hundreds of pounds unit as previously described.

Referring now to Figures 10 to 12 the modified construction shown therein is similar to that described above and like parts are indicated by the use of like references. In this construction there is provided for each denominational unit a flat indicator member 100 having characters engraved or otherwise formed thereon and disposed one above the other to indicate numbers registered in the particular unit. These flat indicator members are mounted between guides 101, 102 so as to be movable in a straight line path therebetween and preferably the indicator members are disposed to be movable in a vertical plane. By so arranging the vertical indicators it is possible, when a total is taken, to sense either the upper or the lower ends of the indicators and as a result of such sensing operation to actuate printing or punching mechanism which will provide either a printed record of the total taken or punch a record of the total in a statistical record card.

The actuating means whereby the indicators are moved in their vertical path consists of a toothed wheel 103 which is co-axial with the transfer gear 24, see Figure 10, and a toothed element 104 which is mounted for angular movement on a bar 105 movable lengthwise on actuation of the zeroising mechanism associated with the accumulator. The toothed element 104 mounted on the movable bar 105 is connected with the indicator 100 of the unit by a pair of links 106, 107, of which the link 106 is connected with the toothed element 104 and the link 107 with the indicator 100. The inner ends of the two links are pivotally connected at 108 so that as the toothed element 104 is turned on engagement with the teeth of the toothed wheel 103 the links 106, 107 impart to the indicator a linear movement equal to the linear movement of the toothed wheel so that the appropriate number appears on the indicator at the viewing position.

The movable bar 105 on which the toothed element 104 is mounted is operated only when the accumulator zeroising mechanism is actuated to return the denominational units to the zero position at the end of an accumulating operation. The mechanism for zeroising the denominational units operates in a manner similar to that described above, but the handle 75, Figure 8, through the levers 64 mounted on the spindle 65, and the connecting link 63 operates a link 62a connected with the upper end of an arm 57a. A face of the gear 30 is provided with lateral zeroising pins 56 and pivoted at 109 to the lower end of the arm 57a is a pawl 59a which, in contra-distinction to the construction above described is arranged to move the gear 30 in a clockwise direction. The pawl 59a moves the zeroising pins 56 against a locating stop 110 pivoted at 111 to the frame of the machine at a position above the axis of rotation of the gear 30, and the stop 110 is urged by a spring 112 into position to be engaged by a pin 56. The underside of the locating stop is arranged during a zeroising operation to abut against a fixed pin 113 extending laterally from the frame of the machine.

During an accumulating operation, the stop 110 is lifted about its pivot 111 by the zeroising pins 56 which are then moving in an anti-clockwise direction as viewed in Figure 10. However, to ensure that when the gear 30 is in a "9" position the stop 110 is resting on the top of a pin 56, the stop is provided with a slot 114 so that it can slide lengthwise relative to its pivot 111. The spring 112 urges the stop to the position shown in Figure 10 and during a zeroising operation it is in this position when its end face 114a is first engaged by a zeroising pin moving in a clockwise direction. The pin 56 then moves the stop lengthwise until the pawl 59a ceases to move the pin.

Mounted at each end of the spindle 71 is a cam 115. These cams engage followers 116 mounted on levers 117 pivoted at 118 to the side frames of the machine. The levers 117 are connected by an angle bar 119 and this bar supports yokes 120 to which are connected links 121 to couple the yokes with the movable bars 105.

On actuation of the handle 75 the cams 115 rock the links 117 about the pivots 118 thereby moving the bars 105 lengthwise so that the teeth of the toothed elements 104 which are carried thereby engage and mesh with the teeth of the toothed wheels 103. The movable bars 105 also each carry an abutment 122 which, on lengthwise movement of the bar 105 to interengage said teeth engages a projection 123 formed on a locking pawl 124 for the accumulator wheel 22 associated therewith to trip the locking pawl 124 out of engagement with the accumulator wheel so that the latter may be rotated in a reverse direction. The locking pawl 124 normally operates to prevent rotation of the accumulator wheel 22 in an anti-clockwise direction.

To prevent rotation of the accumulator wheel 22 in a clockwise direction during zeroising of the accumulator a second locking pawl 125 is pivotally mounted on the right-hand side of the accumulator wheel 22, as viewed in Figure 10 and is urged by a spring 126 towards the teeth of the accumulator wheel. Normally, however, the second locking pawl 125 is held out of engagement with the accumulator wheel by a pin 127 projecting laterally from the movable bar 105. On actuation of the handle 75 to release the first locking pawl 124 the spring 126 causes the second pawl 125 to engage with the accumulator wheel.

In operation, on actuation of the handle 75 in a clockwise direction, as viewed in Figure 10, the accumulator wheels 22 are, during the initial movement of the handle, restrained against movement in clockwise direction, as above described, and are conditioned to be rotated in an anti-clockwise direction. The toothed elements 104 mounted on the movable bars 105 are moved into mesh with the teeth of the toothed wheels 103 which are co-axial with and mounted for angular movement with the transfer members 24. The movement of the bar 105 also causes a trip lever 59b, Fig. 11, which is carried on bar 105 to rock clockwise about its pivot pin 59c which is fixed to frame plate 27 so that a trip pin 59d is moved out of engagement with the tail of pawl 59a, this pawl then being restored by its spring 61 into the path of the zeroising pins 56. Continued movement of the handle 75 causes the link 62a of the first unit to oscillate its associated arm 57a so that the pawl 59a is moved in a clockwise direction, engages the first zeroising pin 56 disposed in its path of movement and rotates the resultant gear 30 in a clockwise direction through a distance equal to the number of teeth by which the carry-over gear has been advanced from the zero position during the preceding accumulating operation. As the zeroising pins 56 are equi-spaced each of the pins is correspondingly moved, and that pin which is next approaching the zero stop 110 is moved into engagement therewith. The angular movement of the resultant wheel 30 due to the action of the pawl 59a is transmitted to the differential to which it is directly geared and also to the train of reduction gearing between it and the next higher denominational unit so that a reverse movement is imparted to each of these integers. As a result of this reverse movement, the partial carry-over remaining in the unit of the next higher order as a result of the accumulating operation is substracted from the differential mechanism of the said next higher unit leaving on that unit only the whole number as registered by the peripheral teeth on the differential cage 25 of that unit. Simultaneously, the whole number registered on the cage 25 of the first unit is substracted therefrom by the reverse rotation of the cage, thus the first unit is zeroised and the carry-over to the next higher unit simultaneously removed therefrom so that during the zeroising of said next higher unit there remains in that unit only a complete whole number as set up on the cage 25 thereof to be zeroised.

On actuation of the next succeeding lever 64 to zeroise the next higher unit the whole number represented thereon is zeroised and during this operation the carry-over registered in the next higher unit is simultaneously cancelled as just described with reference to the zeroising of the first unit.

During the reverse angular movement of a cage 25 to move it to a zero position, the toothed element 104 which engages with the toothed wheel 103 co-axial with the transfer gear 24 associated with the cage is turned by the number of teeth corresponding to the number of teeth by which the cage is moved in the reverse direction to the zero position and the linear movement thus transmitted to the toothed element 104 is translated through the pivoted links 106, 107 to the vertically movable indicator 100 so that a number corresponding to the number of teeth by which the cage is moved in the reverse direction appears on the indicator at the viewing position 128. Thus, the denominational units are successively zeroised and at the end of the zeroising operation the indicators 100, due to the relative positions they then occupy relative to their zero positions, indicate the total inscribed in the accumulator during the preceding accumulating operation. This total is visible at the viewing position 128 and the indicators 100 are disposed at varying heights according to the positions to which they have been moved from their zero positions.

It will be appreciated that although the denominational units, starting with the lowest unit, are zeroised successively, the entire zeroising operation is effected during the clockwise movement of the handle 75 and the total inscribed on the indicators 100 at the viewing position 128 remains visible only until the handle 75 is moved anti-clockwise to return it to its normal position. On the return movement of the handle 75 the toothed elements 104 are moved out of engagement with the toothed wheels 103 and all of the indicators 100 are returned to the zero position.

The toothed element 104 which engages with the toothed wheel 103 co-axial with the transfer gear 24 is shown in the drawings as a toothed wheel, but as only a limited number of teeth are required for engagement with the toothed wheel 103 associated with the transfer gear, the toothed element 104 may, if desired, comprise a segment with which the links 106, 107 communicating with the indicator 100 are connected. The teeth on the toothed wheel and toothed element respectively preferably have pointed profiles to facilitate their engagement when the movable bar 105 is actuated to bring the toothed element 104 into mesh with the toothed wheel 103.

The number of teeth on the toothed element 104 need only be the same as the number of characters on the indicator associated therewith. Thus, for example, if the indicator is provided with numerals 0 to 9 inclusive 10 teeth must be provided on the toothed element, but it is preferred, for constructional purposes, to provide two or three extra teeth on each side of the 10 teeth actually employed for actuating the indicator.

When the accumulator is constructed to register sterling amounts the denominational unit for registering tens of shillings is preferably provided with a resultant gear 30 having on the side thereof, instead of lateral zeroising pins 56 above described, ratchet-shaped teeth 129, Figure 12, to be successively engaged by a locating stop 110 so that the resultant gear for this unit can be moved only one tooth pitch at a time and thus only remove the partial carry-over, which in this case never exceeds 1 tooth pitch.

In each of the embodiments of the invention described above there has been provided a locating stop against which the zeroising pins 56 abut during a zeroising operation. These stops, however, are necessary only when, as described above, the zeroising operation is effected by a single arcuate movement of the handle 75. If the zeroising operation is effected more slowly as by the complete rotation of a handle for several successive turns, the locating stops may be dispensed with.

In one way of effecting the zeroizing operation slowly, a gear wheel identical with the wheel 73 is mounted on the spindle 71 and meshes with a small gear identical with the small gear 72 mounted on the stub shaft 74. The handle is in this instance mounted on the small gear on the stub shaft 74.

It will be appreciated that although manually operated mechanism is described above for zeroising the accumulator, mechanical means may, if desired, be provided to effect actuation of the zeroising mechanism. Such mechanical means can be controlled in known manner from a control hole in a statistical record card, the control hole being sensed by a special sensing pin 11 to actuate the zeroing mechanism. Thus, at the end of a series of record cards having recorded values to be added into the accumulator, the zeroising mechanism would be operated through the medium of the special sensing pin passing through the control hole and the total inscribed in the accumulator would then be transferred to the indicators 100 for a short interval of time, during which the indicators could be read by the eye and, if desired, engaged by sensing fingers for the purpose of actuating printing mechanism, or by punching mechanism adapted to perforate a record in a record card.

I claim:

1. In a zeroizing device for an accumulator having in each order a resultant gear which by its angular position indicates the total of the amounts accumulated in the order, a zeroizing shaft, means to rotate said shaft, a plurality of discs secured to the shaft, one for each denominational order, a slotted pivoted lever for each disc, an operating pin extending laterally from each disc to cooperate with the slot in the associate lever, an arm for each denominational order, each said arm being pivoted about the axis of rotation of the associate resultant gear, a pawl pivoted to each said arm, a plurality of equispaced lateral zeroizing elements extending from each resultant gear for cooperation with the associate pawl, and connections between each said arm and its associate lever.

2. In a zeroizing device for an accumulator having in each order a resultant gear which by its angular position indicates the total of the amounts accumulated in the order, the combination of a plurality of equispaced lateral zeroizing elements extending from each resultant gear, an arm pivoted about the axis of rotation of each resultant gear, a pawl pivoted to each said arm and adapted to engage one of said elements and rotate the associate resultant gear from the position to which it has been advanced to a zero position, a zeroizing shaft, means to rotate said shaft, a plurality of discs secured on said shaft, one for each denominational order, an operating pin extending laterally from each disc, a slotted pivoted lever associated with each said disc and actuated by the associate pin entering the slot therein, each said pin being spaced a different distance from its slot, and connections whereby each lever actuates its associate arm and pawl.

3. The combination of an accumulator having in each order a resultant gear which by its angular position indicates the total of the amounts accumulated in the order, with a zeroizing device comprising a zeroizing shaft and means to rotate it, and, in each order a disc secured on the shaft, an operating pin extending laterally from the disc, a slotted pivoted lever actuated by said pin entering the slot therein, each said pin being spaced a different distance from its slot, an arm pivoted about the axis of said resultant gear, a pawl pivoted to said arm, a plurality of equispaced lateral zeroizing elements extending from said resultant gear and engaged by said pawl to rotate said gear from the position to which it has been advanced to a zero position, and connections whereby said lever actuates said arm.

4. In a machine of the class described having a drive shaft, and an accumulator including in each order a resultant gear which by its angular position indicates the total of the amounts accumulated in that order, an accumulator zeroizing device operable when the machine is at rest and comprising a zeroizing shaft, means to rotate said shaft, a disc secured on the shaft, an operating pin extending laterally from the disc, a slotted pivoted lever actuated by said pin entering the slot therein, an arm pivoted about the axis of rotation of the resultant gear, a link connecting said arm and lever, a pawl pivoted to said arm, a plurality of lateral zeroizing elements extending from said resultant gear for cooperation with said pawl in rotating the resultant gear from an advanced position to a zero position, a member slidable relatively to the drive shaft, a roller on said member, a disc on the drive shaft engaged by said roller to prevent sliding movement of the member but having a peripheral aperture into which the roller can be moved in the rest position of the machine to permit sliding movement of said member, one side of said aperture being so formed as to cause the roller to be moved out of the aperture on rotation of the drive shaft, and connecting means between said member and the zeroizing shaft to prevent rotation of the latter when sliding movement of the former is prevented by the last mentioned disc.

5. In a zeroizing device for an accumulator having in each order a resultant gear which by its angular position indicates the total of the amounts accumulated in that order, the combination of a zeroizing shaft and means to rotate it, and in each order a disc secured on the shaft, a zeroizing pin extending from the disc, a slotted pivoted lever actuated by said pin entering the slot therein, an arm pivoted about the axis of rotation of the resultant gear, a linkage connecting said lever and said arm, a pawl pivoted to said arm, a plurality of lateral zeroizing elements extending from the resultant gear for cooperation with said pawl in restoring the resultant gear to a zero position, and a zero stop resiliently held in a position slightly in advance of zero against which said zeroizing elements are moved by said pawl and which is moved by said elements to zero position.

6. In a zeroizing device for an accumulator having in each order a transmission gear by which amounts are entered into the accumulator and a resultant gear which by its angular position indicates the total of the amounts accumulated in that order, the combination in each order of an arm pivoted about the axis of rotation of the resultant gear, a pawl pivoted to said arm, a plurality of equi-spaced lateral zeroizing elements extending from the resultant gear for cooperation with said pawl in restoring the resultant gear to a zero position, a zeroizing shaft common to all the orders and means to rotate it, means in each order actuated by said shaft to operate said arm and pawl, a linearly movable total indicator, normally disabled connecting means between the transmission gear and the indicator whereby the restoring movements of the resultant gear are transmitted to the indicator, but disabled during accumulating operations, and means actuated by said zeroizing shaft to enable said connecting means.

7. In a zeroizing device for an accumulator having in each order a transmission gear by which amounts are entered into the accumulator and a resultant gear which by its angular position indicates the total of the amounts accumulated in that order, the combination of a zeroizing shaft and means to rotate it, and in each order an arm pivoted about the axis of rotation of the resultant gear, a pawl pivoted to said arm, a plurality of equi-spaced lateral zeroizing elements extending from said resultant gear for cooperation with said pawl in restoring the resultant gear to a zero position, a disc on the zeroizing shaft, an operating pin extending from the disc, a slotted pivoted lever actuated by said pin entering the slot therein, connections for said lever to actuate said arm, a linearly movable total indicator, connecting means between said transmission gear and said indicator whereby the restoring movements of the resultant gear are transmitted to the indicator, but disabled during accumulating operations, and means actuated under control of said zeroizing shaft to enable said connecting means.

8. In a zeroizing device for an accumulator having in each order a transmission gear by which amounts are entered into the accumulator and a resultant gear which by its angular position indicates the total of the amounts accumulated in that order, the combination in each order of an arm pivoted about the axis of rotation of the resultant gear, a pawl pivoted to said arm, a plurality of equi-spaced lateral zeroizing elements extending from the resultant gear for cooperation with said pawl in restoring the resultant gear to a zero position, a zeroizing shaft common to all the orders and means to rotate it, operative connections between said shaft and said arms to rock the latter seriatim beginning with the arm of lowest denominational order a total indicator guided for movements in a straight line path, a tooth wheel coaxial and angularly movable with said transmission gear, a member moved under control of said zeroizing shaft, a toothed element supported for angular movement on said member and moved thereby into mesh with said toothed wheel during zeroizing operations, and link mechanism connecting the toothed element with the indicator.

9. In a zeroizing device for an accumulator having in each order a transmission gear by which amounts are entered into the accumulator and a resultant gear which by its angular position indicates the total of the amounts accumulated in that order, the combination of a zeroizing shaft, one or more cams thereon, means to rotate the shaft, and in each order an arm pivoted about the axis of rotation of the resultant gear, a pawl pivoted to said arm, a plurality of equi-spaced lateral zeroizing elements extending from said resultant gear for cooperation with said pawl in restoring the resultant gear to a zero position, a disc on the zeroizing shaft, an operating pin extending from the disc, a slotted pivoted lever actuated by said pin entering the slot therein, connections for said lever to actuate said arm, a total indicator guided for movements in a straight line path proportional to the distances through which the resultant gear is restored, a toothed wheel coaxial and angularly movable with said transmission gear, a member moved by said cams, a toothed element supported for angular movement on said member and moved thereby into mesh with said toothed wheel during zeroizing operations, and link mechanism connecting the toothed element with the indicator.

ARTHUR THOMAS.

REFERENCES CITED

The following references are of record in the file of this patent:

UNITED STATES PATENTS

| Number | Name | Date |
| --- | --- | --- |
| 1,508,762 | Bacon | Sept. 16, 1924 |
| 1,517,412 | Doerr | Dec. 2, 1924 |
| 1,596,566 | Wheeler | Aug. 17, 1926 |
| 1,853,054 | Horton | Apr. 12, 1932 |
| 1,913,983 | Gardner | June 13, 1933 |
| 2,060,703 | Turck | Nov. 10, 1936 |
| 2,214,029 | Mixer | Sept. 10, 1940 |
| 2,265,628 | Chase | Dec. 9, 1941 |
| 2,309,901 | Hogfors | Feb. 2, 1943 |
| 2,360,615 | Mixer | Oct. 17, 1944 |
| 2,428,084 | Lambert | Sept. 30, 1947 |
| 2,453,342 | Rast | Nov. 9, 1948 |